(12) United States Patent
Lidstrom et al.

(10) Patent No.: US 7,813,298 B2
(45) Date of Patent: Oct. 12, 2010

(54) ROOT CAUSE PROBLEM DETECTION IN NETWORK TRAFFIC INFORMATION

(75) Inventors: Mattias Lidstrom, Stockholm (SE); Tony Larsson, Upplands Valley (SE); Martin Svensson, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 465 days.

(21) Appl. No.: 12/023,535

(22) Filed: Jan. 31, 2008

(65) Prior Publication Data
US 2009/0196186 A1 Aug. 6, 2009

(51) Int. Cl.
H04L 12/26 (2006.01)
(52) U.S. Cl. ...................................... 370/252
(58) Field of Classification Search ........................ None
See application file for complete search history.

(56) References Cited

U.S. PATENT DOCUMENTS

| | | | | |
|---|---|---|---|---|
| 7,412,510 | B2* | 8/2008 | Schweitzer et al. | 709/224 |
| 7,631,065 | B2* | 12/2009 | Schweitzer et al. | 709/224 |
| 2002/0013842 | A1* | 1/2002 | Schweitzer et al. | 709/224 |
| 2002/0087743 | A1* | 7/2002 | Givoly | 709/330 |
| 2003/0097588 | A1* | 5/2003 | Fischman et al. | 713/200 |
| 2004/0225927 | A1 | 11/2004 | Warpenburg et al. | |
| 2004/0249610 | A1 | 12/2004 | Ohsie et al. | |
| 2008/0059346 | A1* | 3/2008 | Schweitzer et al. | 705/30 |
| 2009/0185496 | A1* | 7/2009 | Doverspike et al. | 370/245 |

FOREIGN PATENT DOCUMENTS

| | | |
|---|---|---|
| EP | 1 460 801 | 9/2004 |
| WO | WO 94/19912 | 9/1994 |

OTHER PUBLICATIONS

United Kingdom Search Report for corresponding Application No. GB0901532.2, dated May 19, 2009, 4 pages.

* cited by examiner

Primary Examiner—Anh-Vu Ly
(74) Attorney, Agent, or Firm—Myers Bigel Sibley & Sajovec, P.A.

(57) ABSTRACT

A device retrieves a first subset of events from data associated with a network, and determines one or more discriminating features of the first subset of events using a feature selection method. The device also retrieves one or more additional subsets of events, different than the first subset of events, from the data associated with the network, and cross validates the one or more discriminating features based on the one or more additional subsets of events. The device further detects a feature that is a root cause of a problem in the network based on the cross validated one or more discriminating features.

29 Claims, 15 Drawing Sheets

ROOT CAUSE PROBLEM DETECTION IN NETWORK TRAFFIC INFORMATION

TECHNICAL FIELD

Embodiments described herein relate generally to telecommunication systems, and, more particularly, to problem detection in a telecommunication system.

BACKGROUND

In current telecommunication networks, almost all nodes (or network devices) of the networks generate network traffic information that can be used for charging, billing, accounting, etc. Such information may include detailed records of transactions made in fixed or mobile telecommunication networks. The information may be collected and be used for statistical and/or reporting purposes.

When faults are experienced in a telecommunication network, the collected information is used to detect problems that exist in the telecommunication network. Typically, the information is gathered in an Operations Support System (OSS) that handles fault management and performance management in a telecommunication network. The OSS receives alarms and/or event notifications for various events occurring in the telecommunication network. However, the alarms and/or event notifications are only received for triggers that are set in the telecommunication network, and the OSS is incapable of pre-emptive fault detection in the network.

The collected information may be complemented with additional probing, active measurements, and/or survey data. However, such complementary information is received via a separate process and is reactive to an identified problem in the telecommunication network. Thus, current systems are incapable of detecting hidden problems in a telecommunication network.

SUMMARY

It is an object of the invention to overcome at least some of the above disadvantages and to provide pre-emptive problem detection for telecommunication networks based on network traffic information.

Embodiments described herein may provide systems and/or methods that automatically and continuously measure performance of a network to discover problems before serious network problems are detected. For example, in one embodiment, the systems and/or methods may employ data mining techniques (e.g., feature selection, covariance analysis, cross validation, etc.) to determine network problems and patterns and/or dependencies of network problems that conventional methods are unable to detect. The systems and/or methods may enable users (e.g., network administrators, network technicians, etc.) to understand hidden flaws in a network, and may increase network revenue generation by eliminating problems that cause network services to improperly function. The systems and/or methods may provide a better understanding of network traffic, may provide improved service assurance, and may reduce customer churn associated with an improperly functioning network.

In one embodiment, the systems and/or methods may retrieve a first subset of events for analysis from data associated with a network. The first subset of events may include events associated with failures and/or non-failures occurring in the network. The systems and/or methods may utilize feature selection techniques to determine one or more discriminating features (e.g., network service type, network node type, etc.) of the first subset of events that separate the failure and non-failure events the most. The systems and/or methods may retrieve one or more subsets of events, different than the first subset of events, for analysis from the network data, and may repeat the feature selection techniques with the one or more subsets of events to validate the determined one or more discriminating features. The systems and/or methods may determine that the validated one or more discriminating features are the source (or root cause) of a problem associated with the network, and may propose a solution to the root cause of the problem. The systems and/or methods may test and/or monitor the solution to the root cause of the problem.

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that automatically and continuously measure performance of a network to problems in the network before serious problems are detected.

Figure 1:
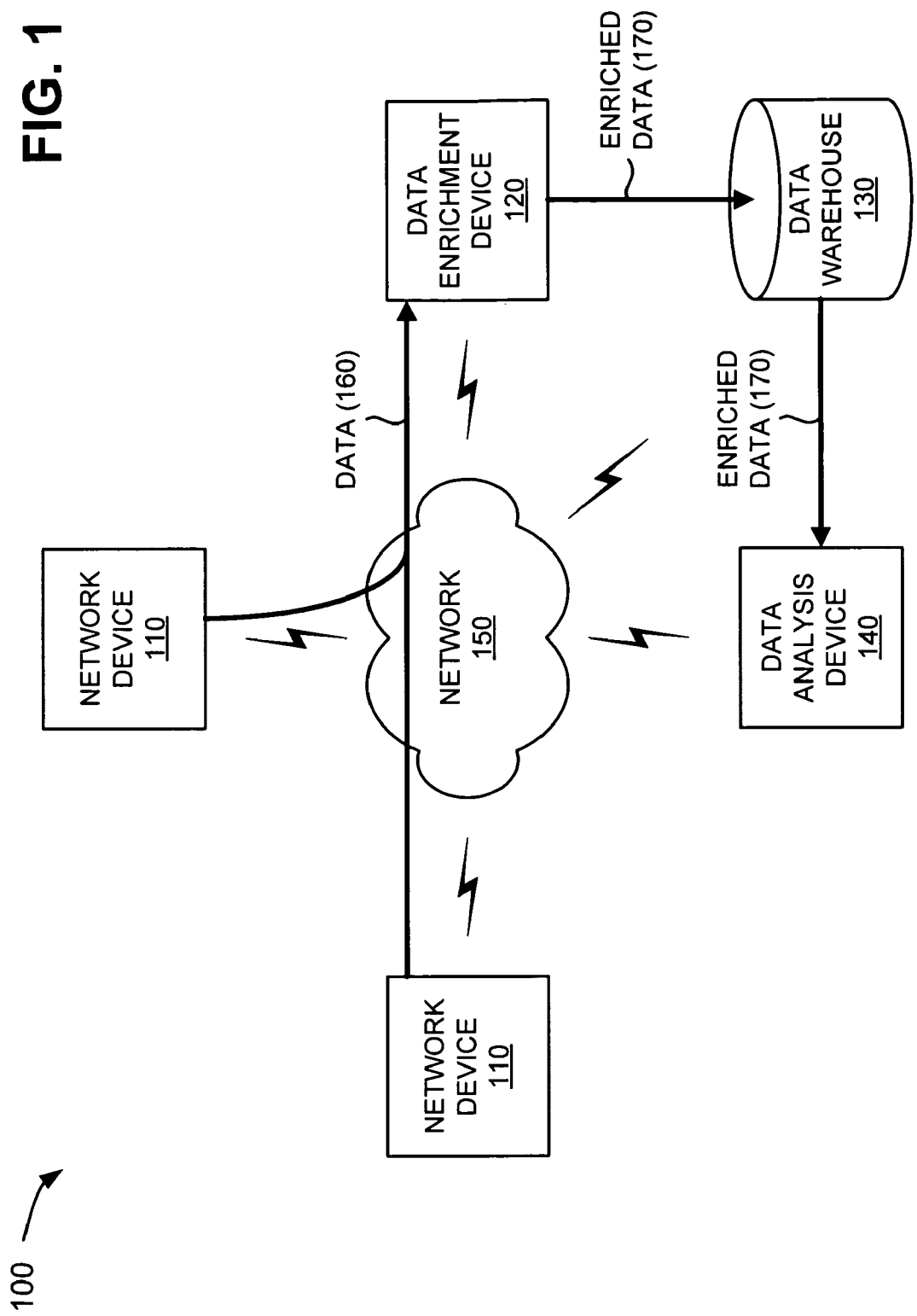
FIG. 1 is diagram illustrating an exemplary network in which systems and/or methods described herein may be implemented.

FIG. 1 is diagram illustrating an exemplary network 100 in which systems and/or methods described herein may be implemented. As illustrated, network 100 may include one or more network devices 110, a data enrichment device 120, a data warehouse 130, and a data analysis device 140 interconnected by a network 150. Network devices 110, data enrichment device 120, data warehouse 130, and/or data analysis device 140 may connect to network 150 via wired and/or wireless connections. Two network devices, a single data enrichment device, a single data warehouse, a single data analysis device, and a single network have been illustrated in FIG. 1 for simplicity. In practice, there may be more network devices, data enrichment devices, data warehouses, data analysis devices, and/or networks. Also, in some instances, a component in network 100 (e.g., one or more of network devices 110, data enrichment device 120, data warehouse 130, and/or data analysis device 140) may perform one or more functions described as being performed by another component or group of components in network 100.

Each of network devices 110 may include any device capable of generating data associated with network 100. For example, each of network devices 110 may include a computer, a router, a switch, a network interface card (NIC), a hub, a bridge, a gateway, a firewall, a proxy server, an optical add-drop multiplexer (OADM), and/or some other type of device that processes and/or transfers data. In one embodiment, each of network devices 110 may include a node of a telecommunication network.

The term "data," as used herein, is to be broadly construed to include any network traffic information capable of being generated by network 150 and/or any device connected to network 150 (e.g., network devices 110), one or more charging or call detail records (CDRs) (e.g., records associated with recent system usage, such as identities of sources (or points of origin), identities of destinations (or endpoints), a duration of each call, an amount billed for each call, a total usage time in a billing period, a total free time remaining in the billing period, a running total charged during the billing period, etc.), probe data (e.g., data received from an action taken or an object used for the purpose of learning something about a state of a network, data received from a program or other device inserted at a juncture in a network for the purpose of monitoring or collecting data about network activity, etc.), etc.

Data enrichment device 120 may include one or more server entities, or other types of computation or communication devices, that gather, process, and/or provide information in a manner described herein. In one embodiment, data enrichment device 120 may receive data 160 from network 150 and/or network devices 110, may filter and/or cleanse data 160 to form enriched data 170, and may provide enriched data 170 to data warehouse 130. Data enrichment device 120 may normalize and/or enrich raw information associated with data 160 to ensure that data 160 is homogenous. In one example, data enrichment device 120 may enrich data 160 into a uniform format suitable for storage by combining data 160 into examples or events that may include failures and/or non-failures (e.g., that occur in network 150). In the data enrichment process, data enrichment device 120 may label the examples or events (e.g., with problem types, based on a service generating the example or event, with a key performance indicator (KPI) associated with data 160, etc.).

Data warehouse 130 may include one or more server entities, or other types of computation or communication devices, that gather, process, and/or provide information in a manner described herein. In one embodiment, data warehouse 130 may include one or more devices that may receive and/or store (e.g., in one or more databases) data associated with network 150 and/or network devices 110. For example, data warehouse 130 may receive (e.g., from data enrichment device 120) and/or store enriched data 170 (e.g., in one or more databases), such as examples or events that may include failures and/or non-failures, labels for the examples or events, etc. In one example, data warehouse 130 may include a repository of historical data associated with network 150, network devices 110, an organization associated with network 150, etc.

Data analysis device 140 may include one or more server entities, or other types of computation or communication devices, that gather, process, and/or provide information in a manner described herein. In one embodiment, data analysis device 140 may retrieve enriched data 170 from data warehouse 130, may extract features from and/or analyze enriched data 170, and may determine a root cause of a problem (e.g., occurring in network 150) based on the extracted features and/or analyzed enriched data 170. Further details of data analysis device 140 are provided below in connection with FIGS. 3-7.

Network 150 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks. In one exemplary embodiment, network 150 may include a telecommunication network.

Although FIG. 1 shows exemplary components of network 100, in other embodiments, network 100 may contain fewer, different, or additional components than depicted in FIG. 1.

Figure 2:
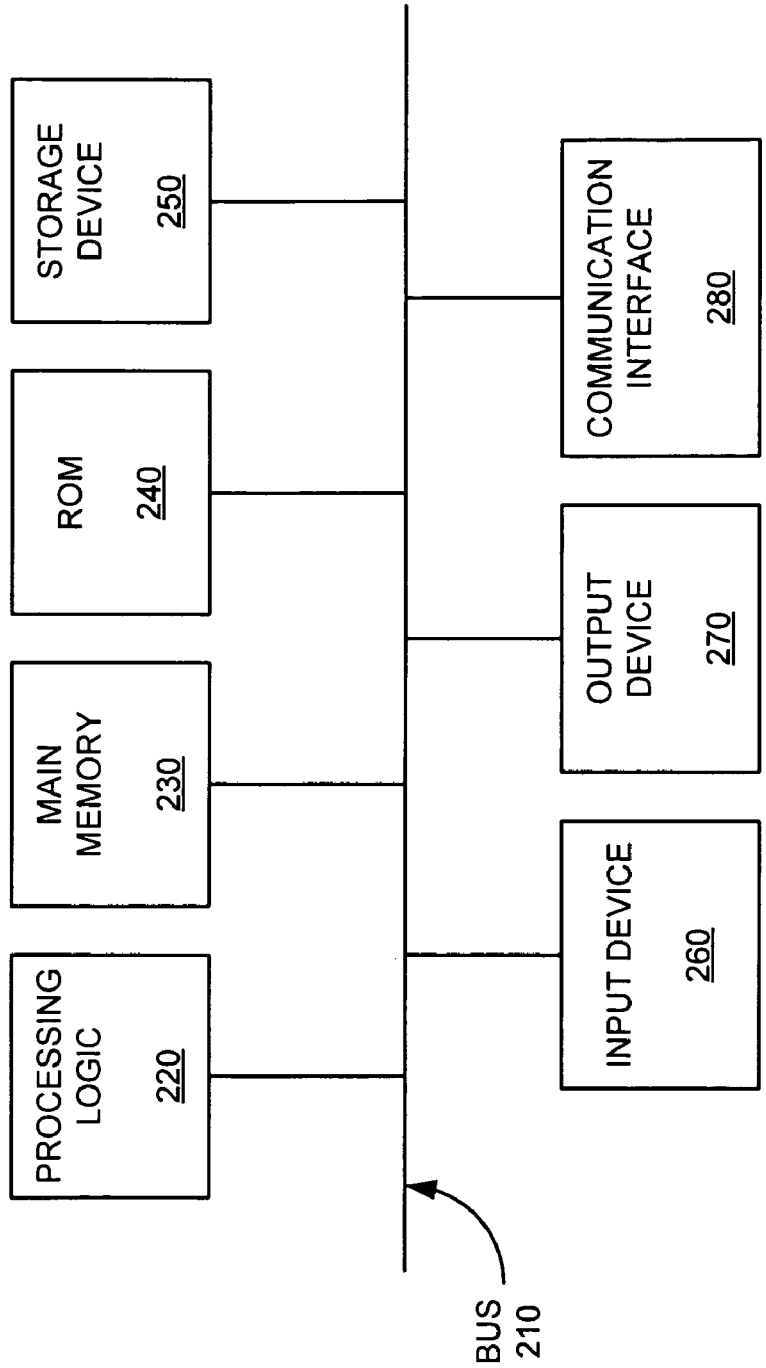
FIG. 2 illustrates exemplary components of a network device, a data enrichment device, a data warehouse, and/or a data analysis device of the network depicted in FIG. 1.

FIG. 2 is an exemplary diagram of a device 200 that may correspond to a network device 110, data enrichment device 120, data warehouse 130, and/or data analysis device 140. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, an application specific integrated circuit (ASIC), a field programmable gate array (FPGA), or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing logic 220 executing software instructions contained in a computer-readable medium, such as main memory 230. A computer-readable medium may be defined as one or more physical and/or logical memory devices. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of device 200, in other embodiments, device 200 may contain fewer, different, or additional components than depicted in FIG. 2. In still other embodiments, one or more components of device 200 may perform one or more other tasks described as being performed by one or more other components of device 200.

Figure 3:
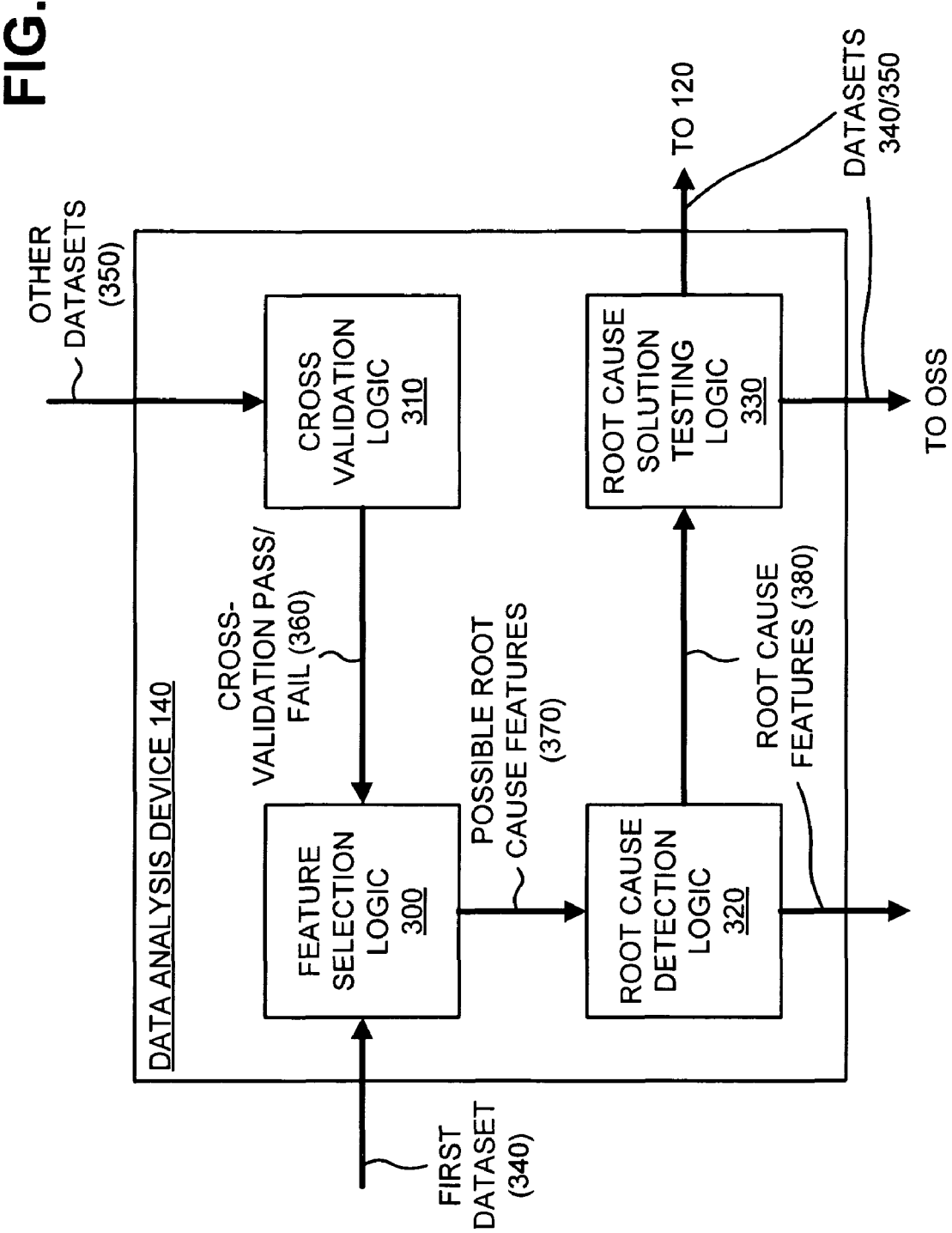
FIG. 3 depicts a diagram of exemplary functional components of the data analysis device of the network illustrated in FIG. 1.

FIG. 3 depicts a diagram of exemplary functional components of data analysis device 140. As illustrated, data analysis device 140 may include feature selection logic 300, cross validation logic 310, root cause detection logic 320, and root cause solution testing logic 330.

Feature selection logic 300 may include any hardware and/or software based logic (e.g., processing logic 220) that enables data analysis device 140 to extract features from enriched data 170 (e.g., provided in data warehouse 130) that may be potential root causes of problems in network 150. In one example, feature selection logic 300 may retrieve a first dataset 340 (e.g., one or more portions of enriched data 170) from data warehouse 130. First dataset 340 may include problems that may be filtered from enriched data 170 based on labels added by the enrichment process. Such problems may include dropped sessions, loss of bearer for a radio resource, resource reservation failures, etc., and may be labeled based on service type, problem type, etc.

Feature selection logic 300 may retrieve first dataset 340 by creating a feature space (e.g., in pattern recognition, a "feature space" is an abstract space where each pattern sample is represented as a point in n-dimensional space whose dimension is determined by a number of features used to describe the patterns) for each type of problem (e.g., based on labels) to be resolved. If, for example, a service (or finding problems in a service) is the problem to be resolved, the feature space may include attributes (e.g., service specific parameters) that describe usage and/or properties of the service. The feature space in this context may define properties of interest used in an analysis phase to discover patterns for each respective issue. In another example, if network devices 110 and network device-related problems are being investigated, the feature space may include network device-specific parameters (e.g., parameters for a version of network device 110, a service label, etc.). If a feature space is created for a specific service, it may be useful to investigate several services in the same manner to cross reference and/or compare problems to determine whether the problems pertain to a particular service or to a set of services.

In one embodiment, feature selection logic 300 may retrieve a subset of examples or events for analysis (e.g., as first dataset 340) based on a time window, a problem to investigate (e.g., a problem type under investigation), a specific service, etc. The time window, problem to investigate, specific service, etc. may define a scope of data that may be retrieved as first dataset 340. Based on the scope of data, feature selection logic 300 may select a random subset of examples or events (e.g., that include failures or errors and non-failures or non-errors) as first dataset 340. Feature selection logic 300 may select a portion of the examples or events within the scope of data so that a remaining portion of examples or events within the scope of data may be used by cross validation logic 310, as described below. Further details of the scope of data are provided below in connection with FIG. 4.

If first dataset 340 includes positive (non-failures) and negative (failures) examples or events from a type of problem (e.g., a lost connection), feature selection logic 300 may determine discriminating features (e.g., service type, node type, network device type, terminal type, etc.) that separate the positive and negative examples or events the most. In one embodiment, feature selection logic 300 may determine such features by using a variety of feature selection methods (e.g., mutual information, information gain, principal feature selection, etc.). Feature selection logic 300 may output possible root cause features 370 (i.e., features that may be root causes of problems) based on the feature selection methods.

Feature selection, also known as variable selection, feature reduction, attribute selection, or variable subset selection, may include selection of a subset of relevant features for building robust learning models. In mutual information feature selection, a measure of general interdependence between random variables (e.g., features) may be determined according to the following equation:

$$MI(f_k, c_i) = \log \frac{Pr(f_k, c_i)}{Pr(f_k) \times Pr(c_i)},$$

where $MI(f_k, c_i)$ is the mutual information measure, $f_k$ is the presence of feature k, $c_i$ is the ith category, $Pr(f_k, c_i)$ is the probability of $(f_k, c_i)$, $Pr(f_k)$ is the probability of $f_k$, and $Pr(c_i)$ is the probability of $c_i$.

In information gain feature selection, a measure of a number of bits of information obtained for category prediction may be determined based on the presence or absence of a feature and according to the following equation:

$$IG(f_k) = \sum_{c \in (c_i, \overline{c_i})} \sum_{f \in (f_k, \overline{f_k})} Pr(f, c) \log \frac{Pr(f, c)}{Pr(f) \times Pr(c)},$$

where $IG(f_k)$ is the information gain measure, $f_k$ is the presence of feature k, $\overline{f_k}$ is absence of feature k, $c_i$ is the ith category, $Pr(f, c)$ is the probability of $(f, c)$, $Pr(f)$ is the probability of f, and $Pr(c)$ is the probability of c.

In principal feature analysis feature selection, a dimensionality of a feature set may be reduced by choosing a subset of original features that contains most of the necessary information, using the same criteria as a principal component analysis. Principal component analysis may find a mapping between an original feature space to a lower dimensional feature space (e.g., to reduce a dimensionality of a problem). In other embodiments, other dimensionality reduction techniques may be used instead of principal feature analysis or principal component analysis.

Cross validation logic 310 may include any hardware and/or software based logic (e.g., processing logic 220) that enables data analysis device 140 to verify features of examples or events that have a greatest impact resulting in a problem (e.g., in network 150). In one example, cross validation logic 310 may retrieve other datasets 350 (e.g., one or more portions of enriched data 170) from data warehouse 130. Other datasets 350 may include problems that may be filtered from enriched data 170 based on labels added by the enrichment process. Such problems may include dropped sessions, loss of bearer for a radio resource, resource reservation failures, etc., and may be labeled based on service type, problem type, etc.

As described above, feature selection logic 300 may retrieve a subset of examples or events for analysis (e.g., as first dataset 340) based on a time window, a problem to investigate, a specific service, etc. The time window, problem to investigate, specific service, etc. may define a scope of data that may be retrieved as first dataset 340. Based on the scope of data, feature selection logic 300 may select a random subset of examples or events (e.g., that include failures or errors and non-failures or non-errors) as first dataset 340. Feature selection logic 300 may select a portion of the examples or events within the scope of data so that a remaining portion of examples or events within the scope of data may be used by cross validation logic 310. Thus, other datasets 350 may include the remaining portion of examples or events within the scope of data, and may include one or more datasets. For example, other datasets 350 may include a second dataset, a third dataset, a fourth dataset, etc.

In one embodiment, cross validation logic 310 may cross validate possible root cause features 370 determined for first dataset 340 based on one of other datasets 350 (e.g., based on second dataset). If cross validation fails, cross validation logic 310 may determine that one or more of possible root cause features 370 determined by feature selection logic 300 is probably not a root cause for a problem. Cross validation logic 360 may provide information 360 to feature selection logic 300 indicating results of the cross validation. Cross validation logic 310 may perform the cross validation multiple times (e.g., based on third dataset, fourth dataset, etc.) to verify features of examples or events that have a greatest impact resulting in a problem (e.g., in network 150). In other words, cross validation logic 310 may eliminate one or more possible root cause features 370. The cross validated possible root cause features 370 may be provided to root cause detection logic 320.

Root cause detection logic 320 may include any hardware and/or software based logic (e.g., processing logic 220) that enables data analysis device 140 to determine one or more features that may be a root cause of a problem (e.g., in network 150). In one example, root cause detection logic 320 may receive one or more possible root cause features 370 from feature selection logic 300, and may determine if one or more of possible root cause features 370 has more than one value (e.g., there may be several types of network devices 110). If one or more of possible root cause features 370 includes more than one value, root cause detection logic 320 may count a number of times each value resulted in a failure and/or a non-failure, and may calculate a ratio of failures to non-failures for each value. Root cause detection logic 320 may determine value(s) with the highest failure/non-failure ratio(s) to be root cause features 380 (i.e., features that are root causes of problems in network 150), and may provide root cause features 380 to root cause solution testing logic 330. In one embodiment, root cause detection logic 320 may output root cause features 380 to a user (e.g., a network administrator, network technician, etc.) of data analysis device 140 so that corrective and/or preemptive measures may be taken (e.g., correct a source of a problem, replace network equipment that has failed or is failing, correct a software configuration issue, etc.).

Root cause solution testing logic 330 may include any hardware and/or software based logic (e.g., processing logic 220) that enables data analysis device 140 to test and/or monitor a solution to a root cause of a problem (e.g., in network 150). In one example, root cause solution testing logic 330 may recommend (e.g., to a user) a solution to correct a root cause of a problem. In another example, root cause solution testing logic 330 may provide parameters (e.g., first dataset 340 and/or other datasets 350), used by data analysis device 140 to detect the problem in network 150, to a mechanism that monitors a solution to the root cause of the problem. In one embodiment, root cause solution testing logic 330 may provide datasets 340/350 to an Operations Support System (OSS) that handles problem management and performance management in a network (e.g., network 150). The OSS may use datasets 340/350 to test and/or monitor one or more solutions to one or more root causes of a problem (e.g., in network 150). Alternatively and/or additionally, data analysis device 140 may test and/or monitor one or more solutions to one or more root causes of a problem (e.g., in network 150) based on datasets 340/350.

Alternatively and/or additionally, active measurements (e.g., via sensors, probes, etc.) of network 150 and/or devices associated with network 150 may be performed to compliment the collected data (e.g., data 160) and to ensure that a problem is detected. Furthermore, data analysis device 140 may repeat the process described above (i.e., generate feedback) with new examples and/or events to determine if the actions taken have solved the one or more root causes of a problem (e.g., in network 150).

Although FIG. 3 shows exemplary functional components of data analysis device 140, in other embodiments, data analysis device 140 may contain fewer, different, or additional components than depicted in FIG. 3. In still other embodiments, one or more functional components of data analysis device 140 may perform one or more other tasks described as being performed by one or more other functional components of data analysis device 140.

Figure 4:
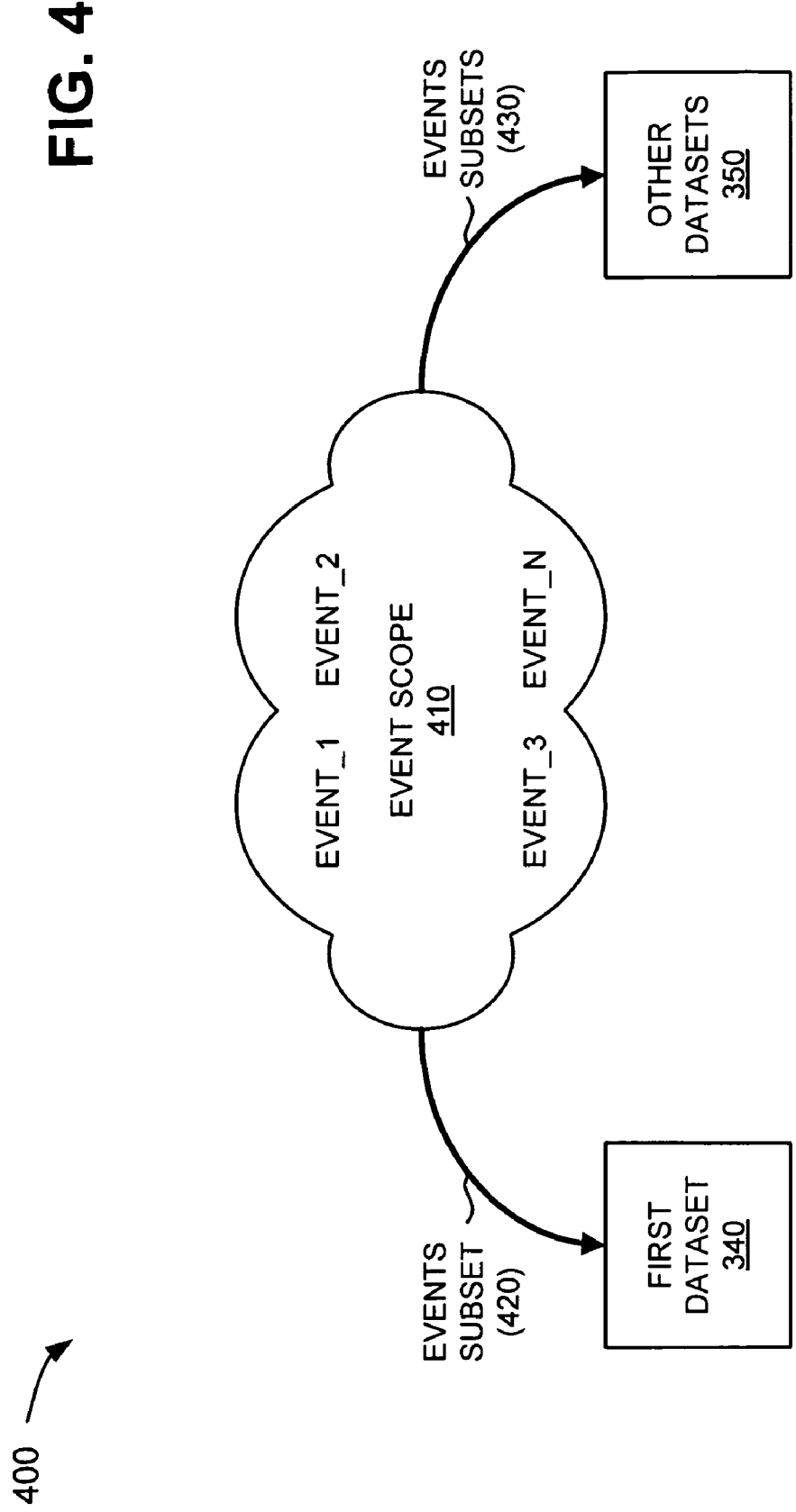
FIG. 4 is a diagram illustrating an exemplary configuration capable of being used by the data analysis device depicted in FIGS. 1 and 3.

FIG. 4 is a diagram illustrating an exemplary configuration 400 capable of being used by data analysis device 140. As illustrated, configuration 400 may include an event scope 410 from which events subset 420 and events subsets 430 may be derived. In one embodiment, event scope 410 may be provided in data warehouse 130, and may be defined by data warehouse 130, data analysis device 140, or another device other than data warehouse 130 and data analysis device 140.

Event scope 410 may include a set of examples or events, under investigation, that include failures or errors and non-failures or non-errors. For example, event_1 and event_3 may be failures, and event_2 and event_N may be non-failures. Event scope 410 may be defined based on time (e.g., event scope 410 may include events/examples associated with a specific time window), service (e.g., event scope 410 may include events/examples associated with a specific service), failure (e.g., event scope 410 may include events/examples associated with a problem type under investigation), etc. In one example, events/examples that are defined based on time and/or service and did not result in errors may be included in event scope 410.

Events subset 420 may include a randomly selected subset of examples or events (e.g., that include failures or errors and non-failures or non-errors) from event scope 410. Events subset 420 may include a portion of the examples or events within event scope 410 so that a remaining portion of examples or events within event scope 410 may be used for events subsets 430. In one embodiment, feature selection logic 300 may select events subset 420 as first dataset 340.

Events subsets 430 may include one or more randomly selected subsets of examples or events (e.g., that include failures or errors and non-failures or non-errors) from event scope 410. Events subsets 430 may include the remaining portion of examples or events within event scope 410 that are not selected for events subset 420. In one embodiment, cross validation logic 310 may select events subsets 430 as other datasets 350.

Although FIG. 4 shows exemplary components of configuration 400, in other embodiments, configuration 400 may contain fewer, different, or additional components than depicted in FIG. 4.

Figure 5:
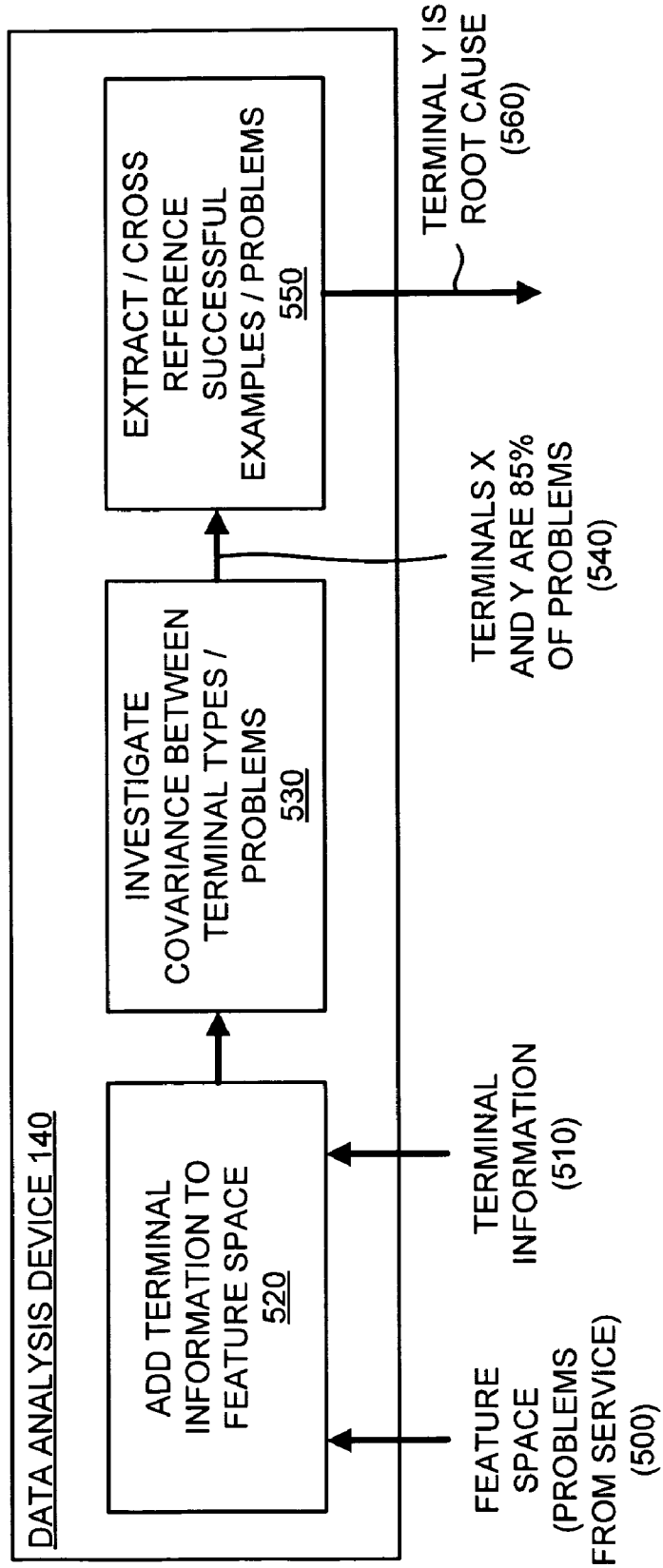
FIGS. 5-7 are diagrams depicting exemplary functional operations capable of being performed by the data analysis device illustrated in FIGS. 1 and 3.
Figure 6:
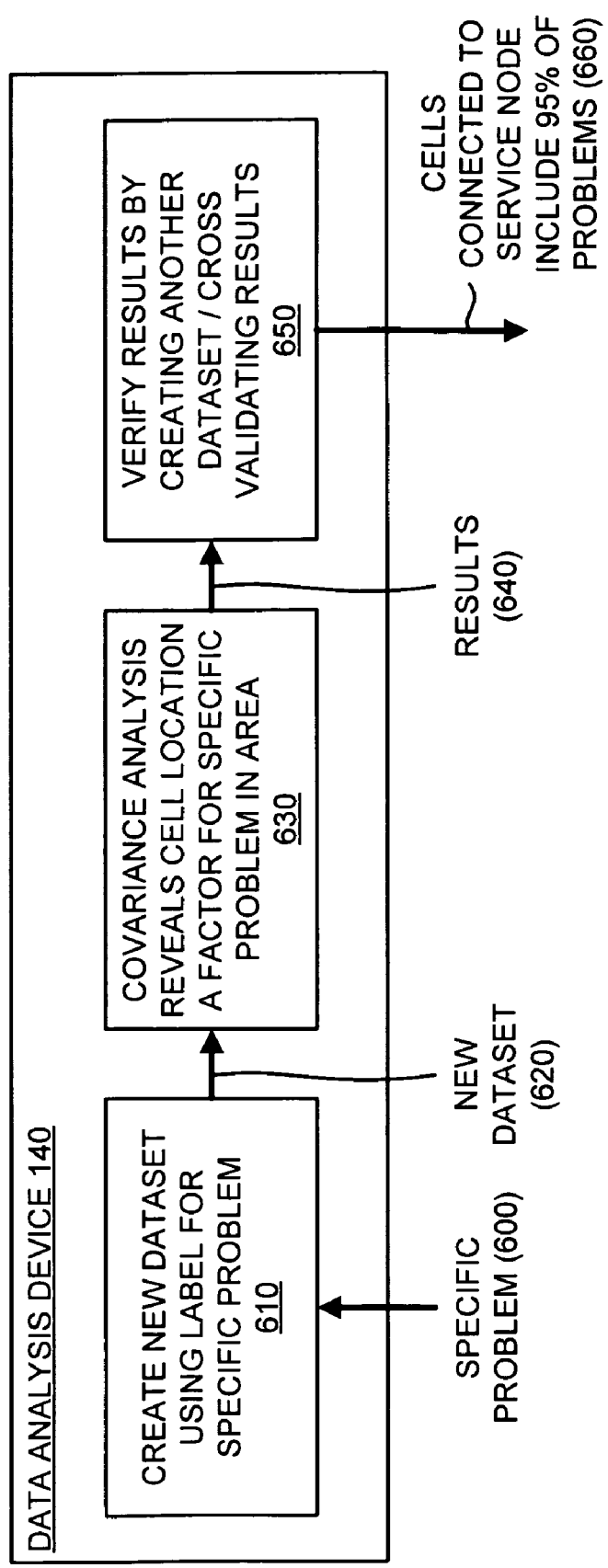
Figure 7:
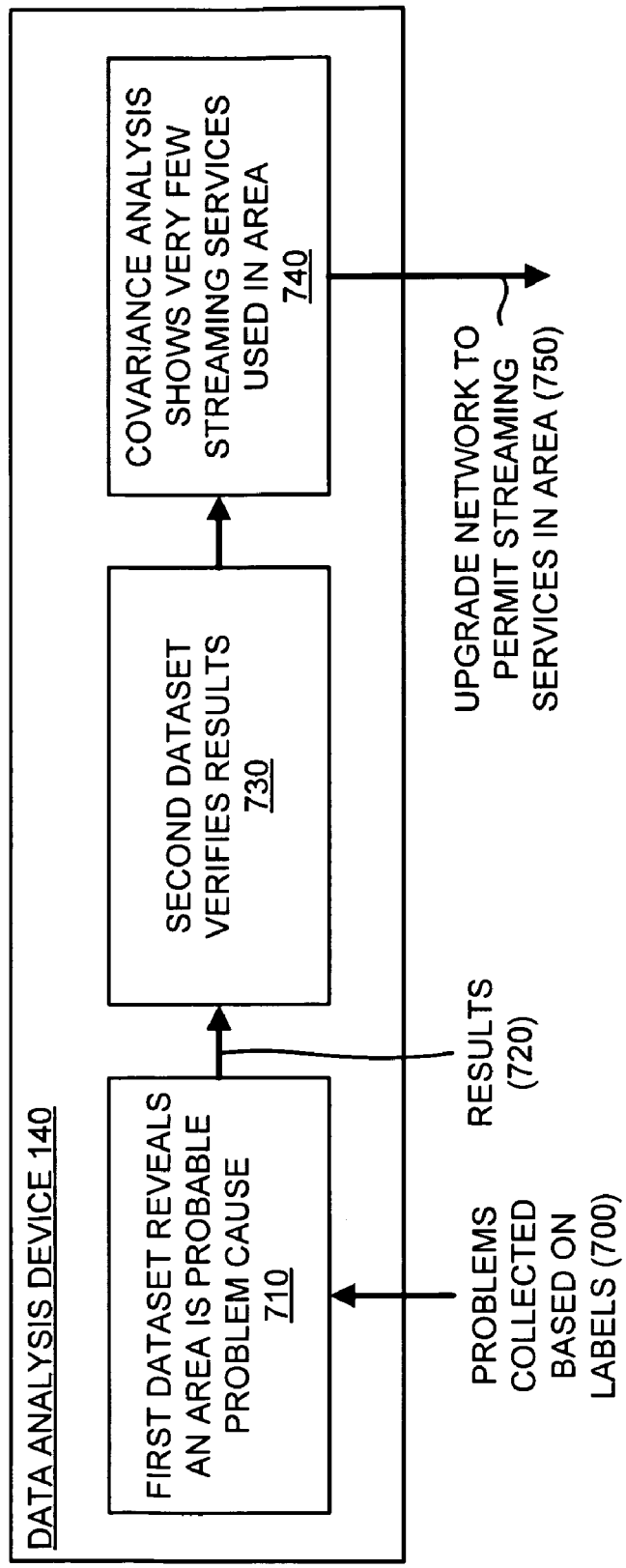

FIGS. 5-7 are diagrams depicting exemplary functional operations capable of being performed by data analysis device 140. Data analysis device 140 may perform other functional operations than illustrated in FIGS. 5-7. In one embodiment, the exemplary functional operations depicted in FIGS. 5-7 may be performed by one or more of feature selection logic 300, cross validation logic 310, root cause detection logic 320, or root cause solution testing logic 330 of data analysis device 140. In another embodiment, the exemplary functional operations depicted in FIGS. 5-7 may be performed by other processing logic of data analysis device 140 other than feature selection logic 300, cross validation logic 310, root cause detection logic 320, and root cause solution testing logic 330.

In the example depicted in FIG. 5, it may be assumed that a user (e.g., a network administrator, a network technician, etc.) wishes to find correlations and problems associated with terminals (e.g., of network 150) and a new service (e.g., offered via network 150). As illustrated, data analysis device 140 may filter problems associated with the new service, and may create a feature space 500 (e.g., containing problems associated with the new service) based on the filtered information. Terminal information 510 (e.g., information associated with terminals of network 150, such as terminal types, etc.) may be retrieved by data analysis device 140 (e.g., from data warehouse 130), and may be added to feature space 500 by data analysis device 140, as indicated by reference number 520. Data analysis device 140 may investigate a covariance between terminal types (e.g., from terminal information 510) and problems (e.g., from feature space 500), as indicated by reference number 530. In this example, assume that data analysis device 140 determines that terminals "X" and "Y" constitute eighty-five (85) percent of the problems recorded for the new service, as indicated by reference number 540.

As further shown in FIG. 5, data analysis device 140 may extract and cross reference successful examples of use of the new service by terminals "X" and "Y" with unsuccessful or problem-generating examples of use of the new service by terminals "X" and "Y," as indicated by reference number 550. From the extraction and cross referencing, assume, for this example, that data analysis device 140 determines that terminal "X" has a ninety-five (95) percent successful usage history and terminal "Y" has a twenty (20) percent successful usage history. Data analysis device 140 may, thus, determine that terminal "Y" is a root cause of problems associated with the new service, as indicated by reference number 560, and corrective measures may be taken or suggested (e.g., a suggestion to repair terminal "Y," a suggestion to replace terminal "Y," etc.).

In the example depicted in FIG. 6, it may be assumed that a user (e.g., a network administrator, a network technician, etc.) wishes to find hidden problems in a network (e.g., network 150). As illustrated, data analysis device 140 may retrieve a specific problem 600 associated with network 150, and may create (or retrieve), as indicated by reference number 610, a new dataset 620 using a label for specific problem 600. Data analysis device 140 may perform a covariance analysis based on new dataset 620 which may reveal, in this example, that a cell location (e.g., in network 150) may be a factor for specific problem 600 occurring in a specific area of network 150, as indicated by reference number 630. Assume that results 640 of the covariance analysis also reveals that specific problem 600 pertains to the specific area of network 150, and that most cell locations in the specific area are connected to the same service node (e.g., of network 150). Data analysis device 140 may verify results 640 by creating an additional dataset and by cross validating results 640 with the additional dataset, as indicated by reference number 650. From the verification of results 640, data analysis device 140 may determine, for example, that cell locations connected to the identified service node include ninety-five (95) percent of the problems, as indicated by reference number 660. This may indicate that the identified service node is the source of the problems, and corrective measures may be taken or suggested (e.g., a suggestion to repair the service node, a suggestion to replace the service node, etc.).

In the example depicted in FIG. 7, it may be assumed that a user (e.g., a network administrator, a network technician, etc.) wishes to find potential revenue leaks (or potential revenue increases) associated with a network (e.g., network 150). As illustrated, data analysis device 140 may collect problems from data warehouse 130 based on labels (e.g., labels associated with potential revenue leaks in network 150), as indicated by reference number 700. Data analysis device 140 may create a first dataset based on the collected problems, and analyze the first dataset. Assume, for this example, that data analysis device 140 determines that the first dataset reveals that an area of network 150 (e.g., an area with a high problem rate) is a probable cause of one or more problems, as indicated by reference number 710. Data analysis device 140 may verify results 720 of the analysis of the first dataset based on a second dataset (e.g., created by data analysis device 140 based on the collected problems), as indicated by reference number 730. Data analysis device 140 may conduct a covariance analysis on the verified results 720. Assume, for this example, that the covariance analysis determines that there are very few streaming services used in the area of network 150 (i.e., that the streaming capabilities are insufficient in the area of network 150), as indicated by reference number 740. Data analysis device 140 may recommend upgrading network 150 to permit streaming services in the area of network 150, as indicated by reference number 750. The streaming services may be implemented in the area of network 150, and may generate additional revenues for an owner of network 150.

Although FIGS. 5-7 show exemplary functional operations of data analysis device 140, in other embodiments, data analysis device 140 may perform fewer, different, or additional functional operations than depicted in FIGS. 5-7.

FIGS. 8-15 depict flow charts of an exemplary process 800 for automatically and continuously measuring performance of a network (e.g., network 150) according to embodiments described herein. In one embodiment, process 800 may be performed by hardware and/or software components of data analysis device 140. In other embodiments, process 800 may be performed by hardware and/or software components of data analysis device 140 in combination with hardware and/or software components of another device (e.g., communicating with data analysis device 140).

Figure 8:
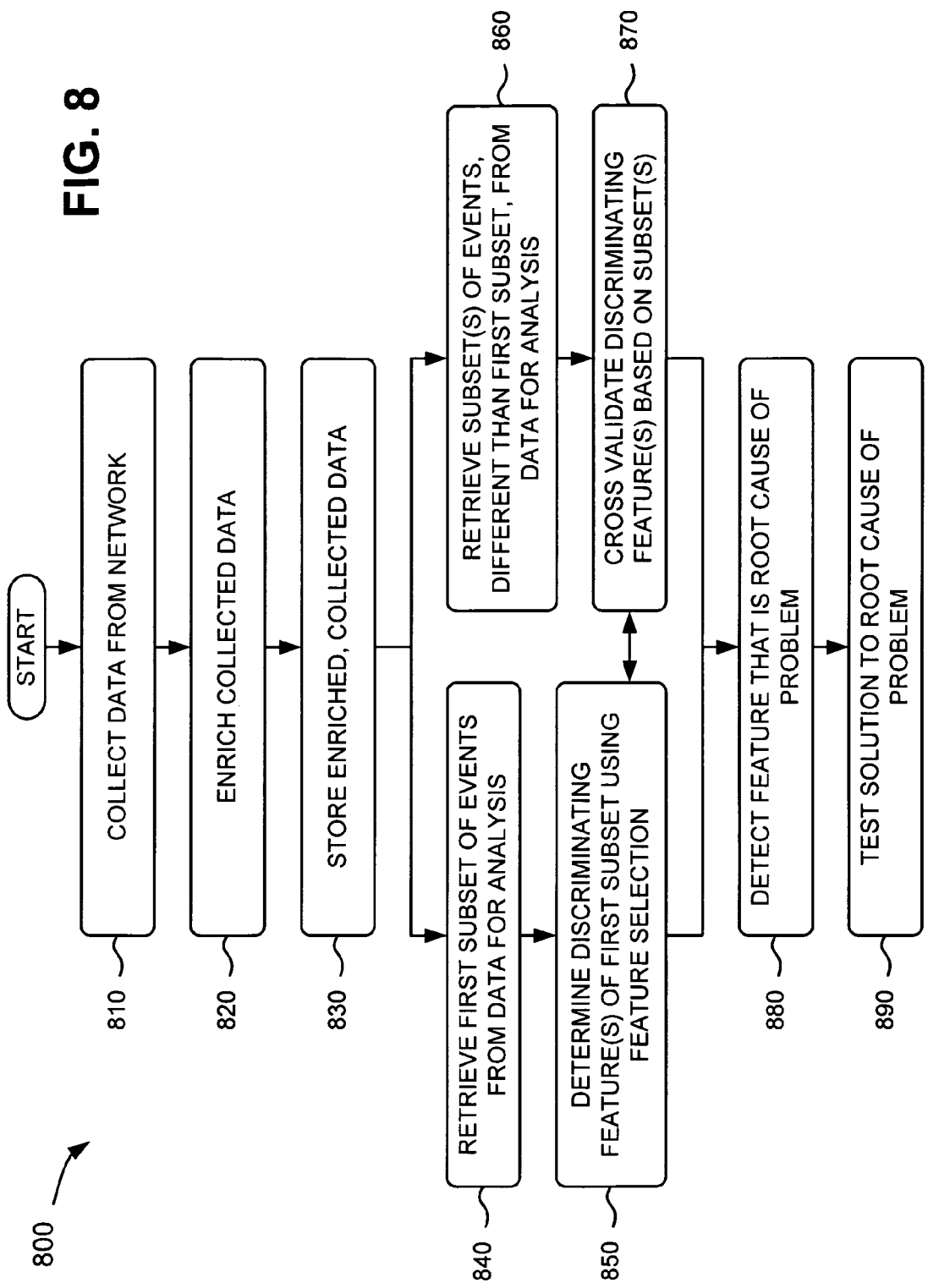
FIGS. 8-15 depict flow charts of an exemplary process for automatically and continuously measuring performance of a network according to embodiments described herein.

As illustrated in FIG. 8, process 800 may begin with collection of data from a network (block 810), enrichment of the collected data (block 820), and storage of the enriched, collected data (block 830). For example, in one embodiment described above in connection with FIG. 1, data enrichment device 120 may receive data 160 from network 150 and/or network devices 110, may filter and/or cleanse data 160 to form enriched data 170, and may provide enriched data 170 to data warehouse 130. Data enrichment device 120 may normalize and/or enrich raw information associated with data 160 to ensure that data 160 is homogenous. Data warehouse 130 may receive and/or store (e.g., in one or more databases) data associated with network 150 and/or network devices 110. For example, data warehouse 130 may receive (e.g., from data enrichment device 120) and/or store enriched data 170 (e.g., in one or more databases), such as examples or events that may include failures and/or non-failures, labels for the examples or events, etc. In one example, data warehouse 130 may include a repository of historical data associated with network 150, network devices 110, an organization associated with network 150, etc.

Returning to FIG. 8, a first subset of events may be retrieved for analysis from the enriched, collected data (block 840), and one or more discriminating features of the first subset of events may be determined using feature selection (block 850). For example, in one embodiment described above in connection with FIG. 3, feature selection logic 300 of data analysis device 140 may retrieve first dataset 340 (e.g., one or more portions of enriched data 170) from data warehouse 130. First dataset 340 may include problems that may be filtered from enriched data 170 based on labels added by the enrichment process. Such problems may include dropped sessions, loss of bearer for a radio resource, resource reservation failures, etc., and may be labeled based on service type, problem type, etc. If first dataset 340 includes positive (non-failures) and negative (failures) examples or events from a type of problem (e.g., a lost connection), feature selection logic 300 may determine discriminating features (e.g., service type, node type, network device type, terminal type, etc.) that separate the positive and negative examples or events the most. In one example, feature selection logic 300 may determine such features by using a variety of feature selection methods.

As further shown in FIG. 8, one or more subsets of events, different than the first subset of events, may be retrieved for analysis from the enriched, collected data (block 860), and the one or more discriminating features may be cross validated based on the one or more subsets of events (block 870). For example, in one embodiment described above in connection with FIG. 3, cross validation logic 310 of data analysis device 140 may receive other datasets 350 (e.g., one or more portions of enriched data 170) from data warehouse 130. A time window, problem to investigate, specific service, etc. may define a scope of data that may be retrieved as first dataset 340. Based on the scope of data, feature selection logic 300 may select (e.g., as first dataset 340) a portion of the examples or events within the scope of data so that a remaining portion of examples or events within the scope of data may be used by cross validation logic 310. Other datasets 350 may include the remaining portion of examples or events within the scope of data, and may include one or more datasets. For example, other datasets 350 may include a second dataset, a third dataset, a fourth dataset, etc. Cross validation logic 310 may cross validate possible root cause features 370 determined for first dataset 340 based on one of other datasets 350 (e.g., based on second dataset). If cross validation fails, cross validation logic 310 may determine that one or more of possible root cause features 370 determined by feature selection logic 300 is probably not a root cause for a problem. Cross validation logic 310 may perform the cross validation multiple times (e.g., based on third dataset, fourth dataset, etc.) to verify features of examples or events that have a greatest impact resulting in a problem (e.g., in network 150).

Returning to FIG. 8, a feature may be detected that is a root cause of a problem in the network (block 880), and a solution to the root cause of the problem may be tested (block 890). For example, in one embodiment described above in connection with FIG. 3, root cause detection logic 320 of data analysis device 140 may receive one or more possible root cause features 370 from feature selection logic 300, may determine one or more of possible root cause features 370 to be root cause features 380 (i.e., features that are root causes of problems in network 150), and may provide root cause features 380 to root cause solution testing logic 330 of data analysis device 140. Root cause solution testing logic 330 may provide parameters (e.g., first dataset 340 and/or other datasets 350), used by data analysis device 140 to detect the problem in network 150, to a mechanism that monitors a solution to the root cause of the problem.

Figure 9:
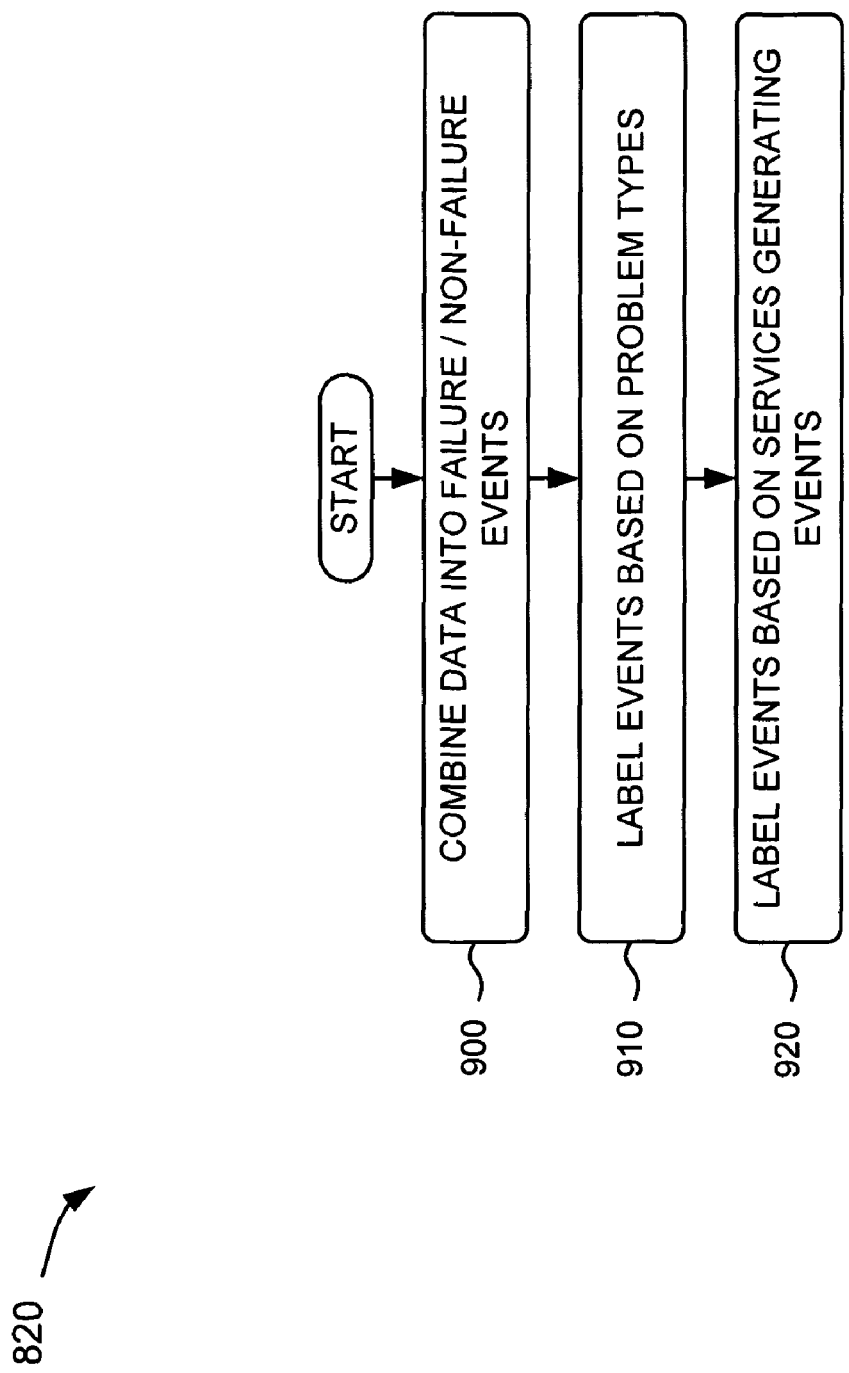

Process block 820 may include the process blocks depicted in FIG. 9. As illustrated in FIG. 9, process block 820 may include combining the data into failure and/or non-failure events (block 900), labeling the events based on problem types (block 910), and/or labeling the events based on services generating the events (block 920). For example, in one embodiment described above in connection with FIG. 1, data enrichment device 120 may enrich data 160 into a uniform format suitable for storage by combining data 160 into examples or events that may include failures and/or non-failures. In the data enrichment process, data enrichment device 120 may label the examples or events (e.g., with problem types, based on a service generating the example or event, with an unfulfilled key performance indicator (KPI) associated with data 160, etc.).

Figure 10:
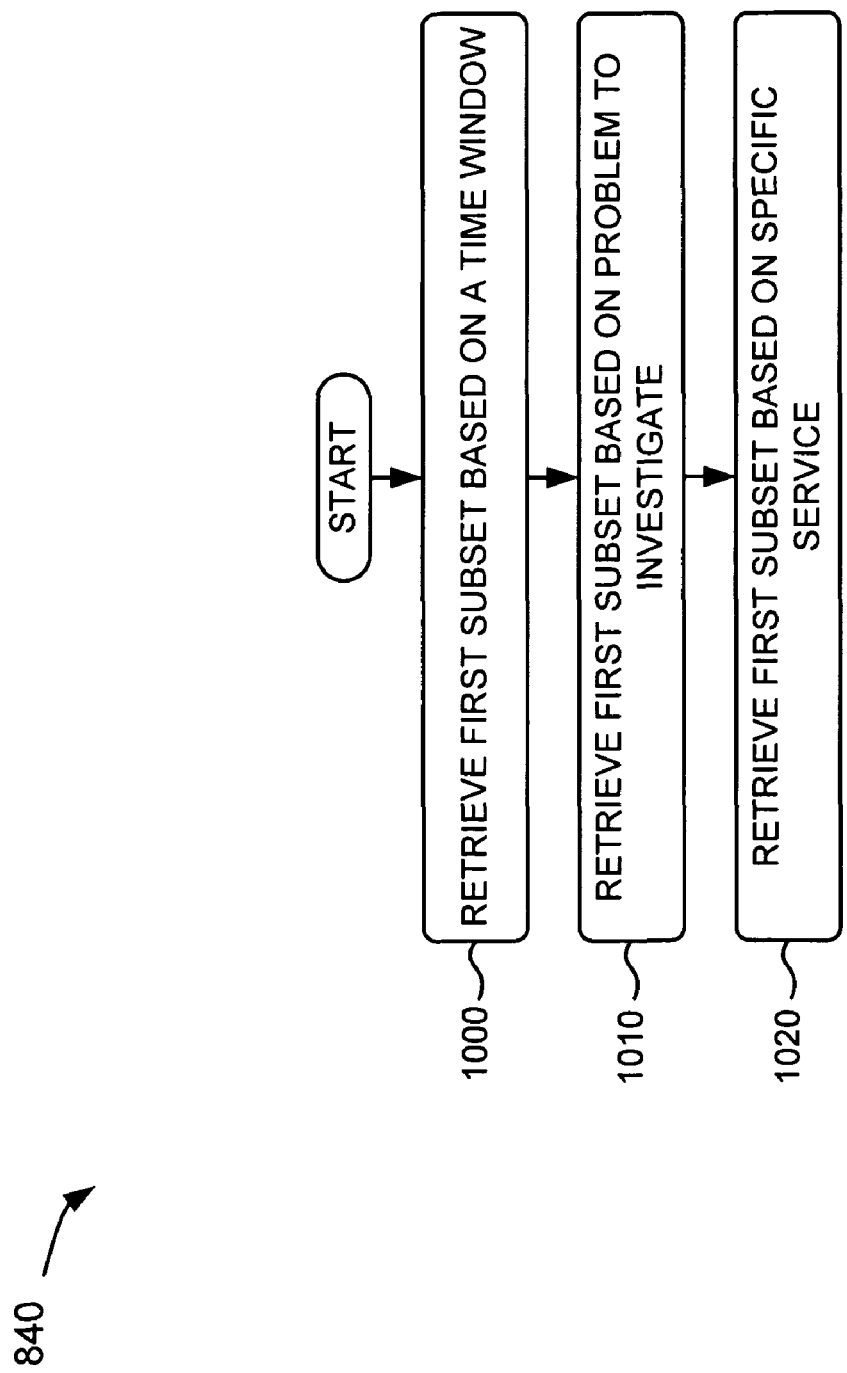

Process block 840 may include the process blocks depicted in FIG. 10. As illustrated in FIG. 10, process block 840 may include retrieving the first subset based on a time window (block 1000), retrieving the first subset based on a problem to investigate (block 1010), and/or retrieving the first subset based on a specific service (block 1020). For example, in one embodiment described above in connection with FIG. 3, feature selection logic 300 may retrieve a subset of examples or events for analysis (e.g., as first dataset 340) based on a time window, a problem to investigate, a specific service, etc. The time window, problem to investigate, specific service, etc. may define a scope of data that may be retrieved as first dataset 340. Based on the scope of data, feature selection logic 300 may select a random subset of examples or events (e.g., that include failures or errors and non-failures or non-errors) as first dataset 340. Feature selection logic 300 may select a portion of the examples or events within the scope of data so that a remaining portion of examples or events within the scope of data may be used by cross validation logic 310.

Figure 11:
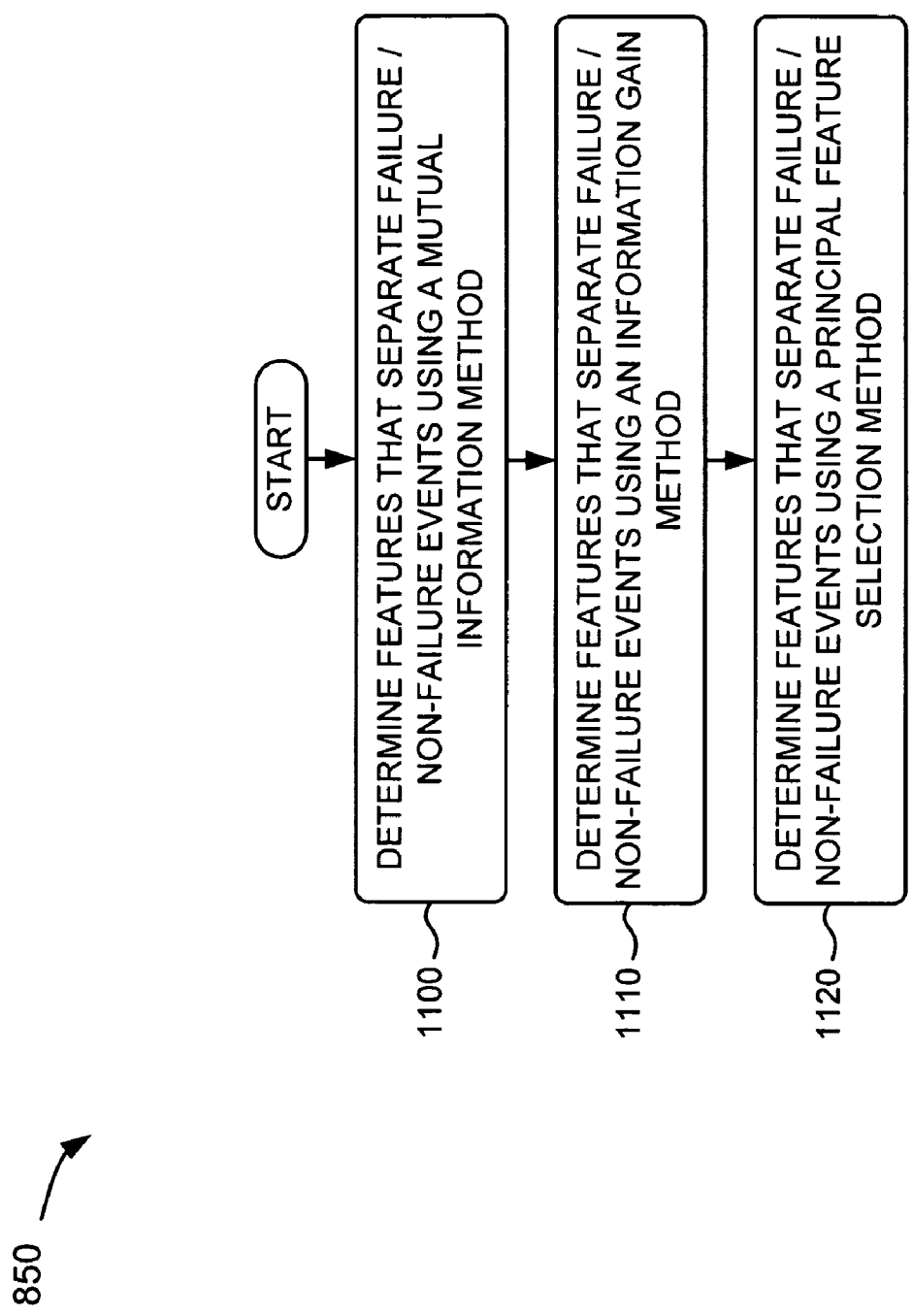

Process block 850 may include the process blocks depicted in FIG. 11. As illustrated in FIG. 11, process block 850 may include determining one or more features that separate failure and/or non-failure events using a mutual information feature selection method (block 1100), determining one or more features that separate failure and/or non-failure events using an information gain feature selection method (block 1110), and/or determining one or more features that separate failure and/or non-failure events using a principal feature selection method (block 1120). For example, in one embodiment described above in connection with FIG. 3, feature selection logic 300 may determine features by using a variety of feature selection methods (e.g., mutual information, information gain, principal feature selection, etc.). Feature selection, also known as variable selection, feature reduction, attribute selection, or variable subset selection, may include selection of a subset of relevant features for building robust learning models. In mutual information feature selection, a measure of general interdependence between random variables (e.g., features) may be determined. In information gain feature selection, a measure of a number of bits of information obtained for category prediction may be determined. In principal feature analysis feature selection, a dimensionality of a feature set may be reduced by choosing a subset of original features that contains most of the necessary information, using the same criteria as a principal component analysis. Principal component analysis may find a mapping between an original feature space to a lower dimensional feature space (e.g., to reduce a dimensionality of a problem).

Figure 12:

Process block 860 may include the process blocks depicted in FIG. 12. As illustrated in FIG. 12, process block 860 may include retrieving the one or more subsets of events, different than the first subset of events, based on a time window (block 1200), retrieving the one or more subsets of events, different than the first subset of events, based on a problem to investigate (block 1210), and/or retrieving the one or more subsets of events, different than the first subset of events, based on a specific service (block 1220). For example, in one embodiment described above in connection with FIG. 3, feature selection logic 300 may retrieve a subset of examples or events for analysis (e.g., as first dataset 340) based on a time window, a problem to investigate, a specific service, etc. The time window, problem to investigate, specific service, etc. may define a scope of data that may be retrieved as first dataset 340. Based on the scope of data, feature selection logic 300 may select a random subset of examples or events (e.g., that include failures or errors and non-failures or non-errors) as first dataset 340. Feature selection logic 300 may select a portion of the examples or events within the scope of data so that a remaining portion of examples or events within the scope of data may be used by cross validation logic 310. Thus, other datasets 350 may include the remaining portion of examples or events within the scope of data, and may include one or more datasets. For example, other datasets 350 may include a second dataset, a third dataset, a fourth dataset, etc.

Figure 13:

Process block 870 may include the process blocks depicted in FIG. 13. As illustrated in FIG. 13, process block 870 may include repeating feature selection with the one or more subsets to validate the determined discriminating features (block 1300), determining a feature as not being the root cause of the problem if the validation fails (block 1310), and determining one or more features that have a greatest impact resulting in a problem (block 1320). For example, in one embodiment described above in connection with FIG. 3, cross validation logic 310 may cross validate possible root cause features 370 determined for first dataset 340 based on one of other datasets 350 (e.g., based on second dataset). If cross validation fails, cross validation logic 310 may determine that one or more of possible root cause features 370 determined by feature selection logic 300 is probably not a root cause for a problem. Cross validation logic 310 may perform the cross validation multiple times (e.g., based on third dataset, fourth dataset, etc.) to verify features of examples or events that have a greatest impact resulting in a problem (e.g., in network 150). In other words, cross validation logic 310 may eliminate one or more possible root cause features 370.

Figure 14:
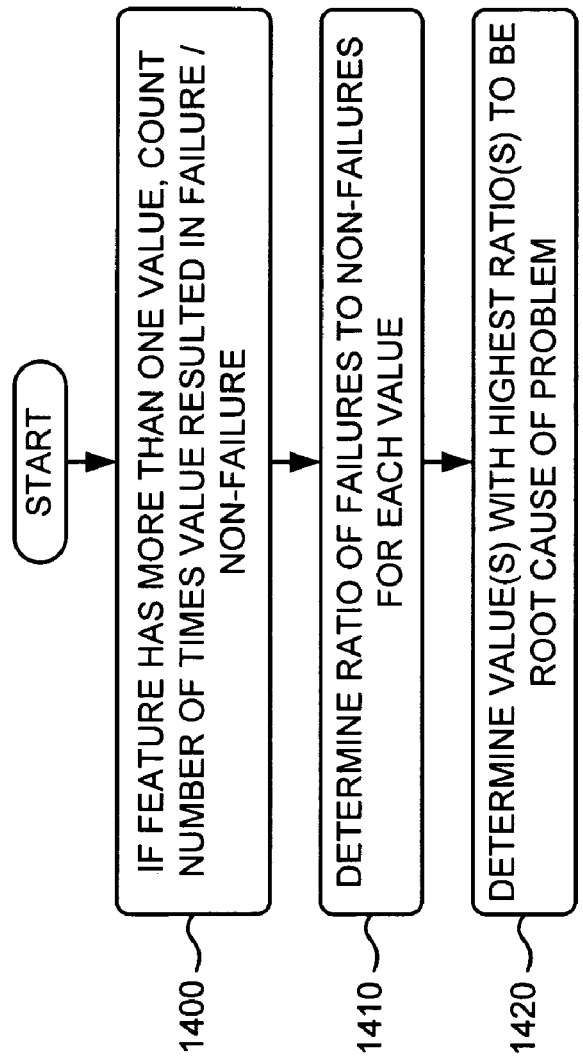

Process block 880 may include the process blocks depicted in FIG. 14. As illustrated in FIG. 14, process block 880 may include counting a number of times a value resulted in a failure and/or a non-failure if a feature has more than one value (block 1400), determining a ratio of failures to non-failures for each value (block 1410), and determining one or more values with the highest ratio(s) to be the root cause of the problem (block 1420). For example, in one embodiment described above in connection with FIG. 3, root cause detection logic 320 may receive one or more possible root cause features 370 from feature selection logic 300, and may determine if one or more of possible root cause features 370 has more than one value (e.g., there may be several types of network devices 110). If one or more of possible root cause features 370 includes more than one value, root cause detection logic 320 may count a number of times each value resulted in a failure and/or a non-failure, and may calculate a ratio of failures to non-failures for each value. Root cause detection logic 320 may determine value(s) with the highest failure/non-failure ratio(s) to be root cause features 380 (i.e., features that are root causes of problems in network 150), and may provide root cause features 380 to root cause solution testing logic 330.

Figure 15:
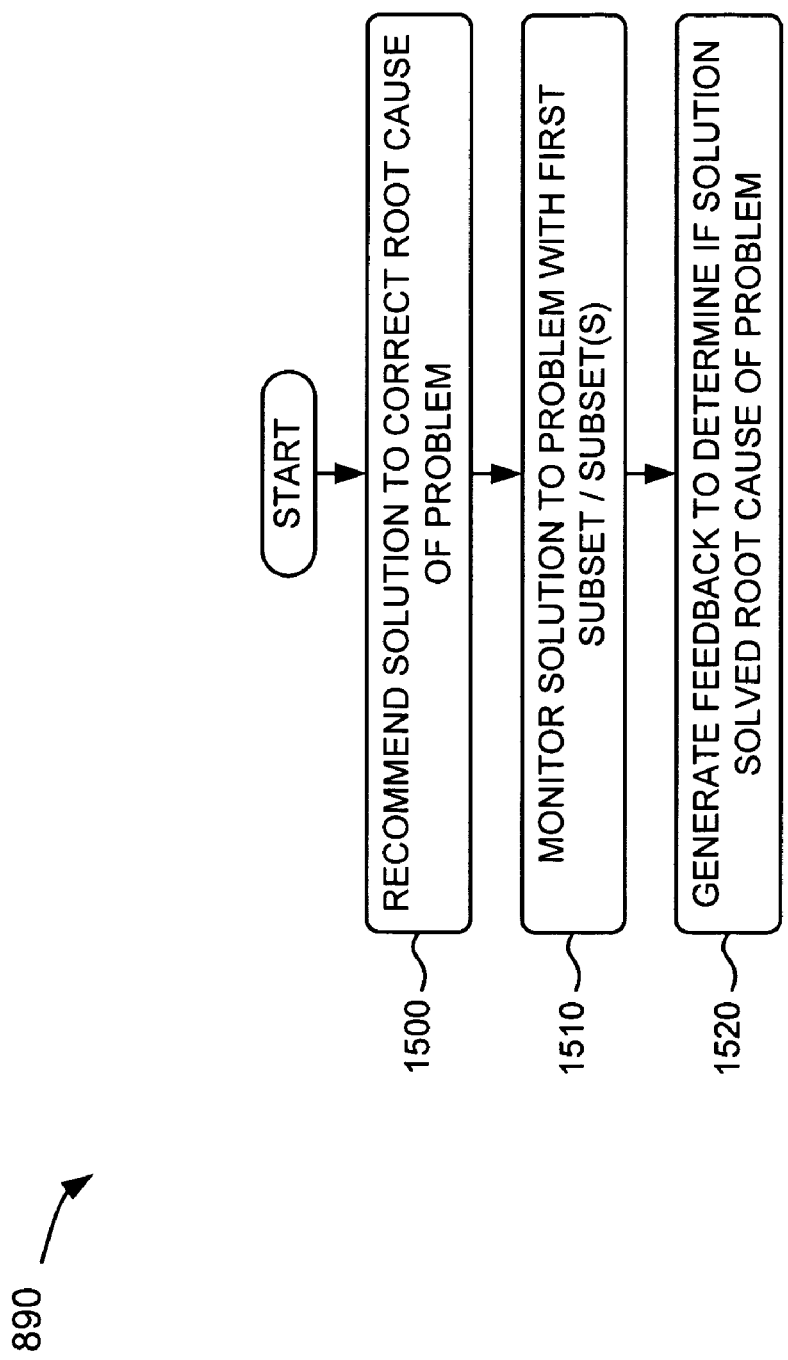

Process block 890 may include the process blocks depicted in FIG. 15. As illustrated in FIG. 15, process block 890 may include recommending a solution to the root cause of the problem (block 1500), monitoring the solution to the problem with the first subset of events and the one or more subsets of events (block 1510), and generating feedback to determine if the solution solved the root cause of the problem (block 1520). For example, in one embodiment described above in connection with FIG. 3, root cause solution testing logic 330 may recommend (e.g., to a user) a solution to correct a root cause of a problem, or may output (e.g., to the user) the root cause of the problem (e.g., via output device 260). Root cause solution testing logic 330 may provide parameters (e.g., first dataset 340 and/or other datasets 350), used by data analysis device 140 to detect the problem in network 150, to a mechanism that monitors a solution to the root cause of the problem. In one example, root cause solution testing logic 330 may provide datasets 340/350 to an OSS that may use datasets 340/350 to test and/or monitor one or more solutions to one or more root causes of a problem (e.g., in network 150). Alternatively and/or additionally, data analysis device 140 may test and/or monitor one or more solutions to one or more root causes of a problem (e.g., in network 150) based on datasets 340/350. Data analysis device 140 may repeat the process described above (i.e., generate feedback) with new examples and/or events to determine if the actions taken have solved the one or more root causes of a problem (e.g., in network 150).

Embodiments described herein may provide systems and/or methods that automatically and continuously measure performance of a network to discover problems before serious network problems are detected. For example, in one embodiment, the systems and/or methods may employ data mining techniques (e.g., feature selection, covariance analysis, cross validation, etc.) to determine network problems and patterns and/or dependencies of network problems that conventional methods are unable to detect. The systems and/or methods may enable users (e.g., network administrators, network technicians, etc.) to understand hidden flaws in a network, and may increase network revenue generation by eliminating problems that cause network services to improperly function. The systems and/or methods may provide a better understanding of network traffic, may provide improved service assurance, and may reduce customer churn associated with an improperly functioning network.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-15, the order of the blocks may be modified in other embodiments. Further, non-dependent blocks may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. The logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device associated with a network, comprising:
    retrieving, by the device, a first subset of events for analysis from data associated with the network;
    determining one or more discriminating features of the first subset of events using a feature selection method;
    retrieving one or more additional subsets of events, different than the first subset of events, for analysis from the data associated with the network;
    cross validating the one or more discriminating features based on the one or more additional subsets of events; and
    detecting a feature that is a root cause of a problem in the network based on the cross validated one or more discriminating features;
    wherein detecting a feature that is a root cause of a problem in the network further comprising:
        counting, if a feature has more than one value, a number of times a value resulted in a failure and a number of times the value resulted in a non-failure;
        determining a ratio of failures to non-failures for each value; and
        determining a value with a highest ratio to be the root cause of the problem.

2. The method of claim 1, where retrieving a first subset of events comprises at least one of:
    retrieving the first subset of events based on a time window;
    retrieving the first subset of events based on a problem to investigate; or
    retrieving the first subset of events based on a network service.

3. The method of claim 1, where determining one or more discriminating features comprises at least one of:
    determining features that separate failure events and non-failure events of the first subset of events using a mutual information feature selection method;
    determining features that separate failure events and non-failure events of the first subset of events using an information gain feature selection method; or
    determining features that separate failure events and non-failure events of the first subset of events using a principal feature analysis feature selection method.

4. The method of claim 1, where retrieving one or more additional subsets of events comprises at least one of:
    retrieving the one or more additional subsets of events, different than the first subset of events, based on a time window;
    retrieving the one or more additional subsets of events, different than the first subset of events, based on a problem to investigate; or
    retrieving the one or more additional subsets of events, different than the first subset of events, based on a network service.

5. The method of claim 1, where cross validating the one or more discriminating features comprises:
    repeating the feature selection method with the one or more additional subsets of events to validate the one or more discriminating features;
    determining one of the one or more discriminating features to not be the root cause of the problem in the network if the one of the one or more discriminating features fail to be validated; and
    determining the one or more discriminating features that have a greatest impact resulting in a failure in the network.

6. The method of claim 1, where the data comprises enriched data that is stored in a data warehouse associated with the network.

7. The method of claim 6, where the enriched data comprises data combined into failure and non-failure events occurring in the network, and labels for the events that are based on problem types or based on network services generating the events.

8. The method of claim 1, further comprising:
    recommending a solution to the root cause of the problem in the network; and
    testing the solution to the root cause of the problem.

9. The method of claim 8, where testing a solution to the root cause of the problem comprises at least one of:
    monitoring the solution to the root cause of the problem based on the first subset of events and the one or more additional subsets of events; or
    generating feedback to determine if the solution solved the root cause of the problem.

10. A device, comprising:
    a hardware processing logic configured to:
        retrieve a first subset of events from data associated with a network,
        determine one or more discriminating features of the first subset of events using a feature selection method,
        retrieve one or more additional subsets of events, different than the first subset of events, from the data associated with the network,
        cross validate the one or more discriminating features based on the one or more additional subsets of events,
        detect a feature that is a root cause of a problem in the network based on the cross validated one or more discriminating features, and
        output the root cause of the problems;
    wherein the hardware processing logic is further configured to:
        count, if a feature has more than one value, a number of times a value resulted in a failure and a number of times the value resulted in a non-failure;
        determine a ratio of failures to non-failures for each value; and
        determine a value with a highest ratio to be the root cause of the problem.

11. The device of claim 10, where the data associated with the network comprises at least one of:
    network traffic information generated by the network and any device connected to the network;
    one or more charging or call detail records (CDRs) associated with the network; or
    probe data associated with the network.

12. The device of claim 10, where the data comprises enriched data that is stored in a data warehouse associated with the network.

13. The device of claim 12, where the enriched data comprises data combined into failure and non-failure events occurring in the network, and labels for the events that are based on problem types or based on network services generating the events.

14. The device of claim 10, where the first subset of events comprises a subset of events occurring in the network and, when retrieving the first subset of events, the hardware processing logic is configured to:
retrieve the first subset of events based on a defined scope of events.

15. The device of claim 14, where the first subset of events comprises events that include failures and non-failures.

16. The device of claim 15, where the hardware processing logic is further configured to:
retrieve a portion of events within the defined scope of events as the first subset of events; and
retrieve a remaining portion of events within the defined scope of events as the one or more additional subsets of events.

17. The device of claim 10, where the one or more subsets of events comprise events that include failures and non-failures.

18. The device of claim 10, where the one or more discriminating features comprise at least one of:
a type of service associated with the network;
a type of node associated with the network;
a type of network device; or
a type of terminal associated with the network.

19. The device of claim 10, where the network comprises a telephone network.

20. The device of claim 10, where the hardware processing logic is further configured to at least one of:
retrieve the first subset of events based on a time window;
retrieve the first subset of events based on a problem to investigate; or
retrieve the first subset of events based on a network service.

21. The device of claim 10, where the hardware processing logic is further configured to at least one of:
determine features that separate failure events and non-failure events of the first subset of events using a mutual information feature selection method;
determine features that separate failure events and non-failure events of the first subset of events using an information gain feature selection method; or
determine features that separate failure events and non-failure events of the first subset of events using a principal feature analysis feature selection method.

22. The device of claim 10, where the hardware processing logic is further configured to at least one of:
retrieve the one or more additional subsets of events, different than the first subset of events, based on a time window;
retrieve the one or more additional subsets of events, different than the first subset of events, based on a problem to investigate; or
retrieve the one or more additional subsets of events, different than the first subset of events, based on a network service.

23. The device of claim 10, where the hardware processing logic is further configured to:
repeat the feature selection method with the one or more additional subsets of events to validate the one or more discriminating features;
determine one of the one or more discriminating features to not be the root cause of the problem in the network if the one of the one or more discriminating features fail to be validated; and
determine the one or more discriminating features that have a greatest impact resulting in a problem in the network.

24. The device of claim 10, where the hardware processing logic is further configured to:
recommend a solution to the root cause of the problem in the network; and
test the solution to the root cause of the problem.

25. The device of claim 24, where the hardware processing logic is further configured to at least one of:
monitor the solution to the root cause of the problem based on the first subset of events and the one or more additional subsets of events; or
generate feedback to determine if the solution solved the root cause of the problem.

26. The device of claim 10, where the hardware processing logic is further configured to:
retrieve the first subset of events by creating a feature space for each type of network problem to be resolved.

27. The device of claim 26, where the feature space defines properties of interest in the network that are used to discover the root cause of the problem in the network.

28. The device of claim 26, where the feature space comprises at least one of:
attributes that describe usage or properties of a network service if problems related to the network service are under investigation; or
network device-specific parameters if network device-related problems are under investigation.

29. A system, comprising:
a data enrichment device configured to:
collect data from a network, and
enrich the collected data;
a data warehouse configured to store the enriched, collected data; and
a data analysis device configured to:
retrieve, from the data warehouse, a first subset of events for analysis from the enriched, collected data,
determine one or more discriminating features of the first subset of events using a feature selection method,
retrieve, from the data warehouse, one or more additional subsets of events, different than the first subset of events, for analysis from the enriched, collected data,
cross validate the one or more discriminating features based on the one or more additional subsets of events, and
detect a feature that is a root cause of a problem in the network based on the cross validated one or more discriminating features;
wherein detecting a feature that is a root cause of a problem in the network further comprising:
counting, if a feature has more than one value, a number of times a value resulted in a failure and a number of times the value resulted in a non-failure;
determining a ratio of failures to non-failures for each value; and
determining a value with a highest ratio to be the root cause of the problem.

* * * * *

UNITED STATES PATENT AND TRADEMARK OFFICE
CERTIFICATE OF CORRECTION

| | | |
|---|---|---|
| PATENT NO. | : 7,813,298 B2 | Page 1 of 1 |
| APPLICATION NO. | : 12/023535 | |
| DATED | : October 12, 2010 | |
| INVENTOR(S) | : Lidstrom et al. | |

It is certified that error appears in the above-identified patent and that said Letters Patent is hereby corrected as shown below:

On the Title Page, in Field (75), under "Inventors", in Column 1, Line 2, delete "Valley" and insert -- Väsby --, therefor.

In Column 1, Line 59, delete "chum" and insert -- churn --, therefor.

In Column 16, Line 50, in Claim 10, delete "problems;" and insert -- problem, --, therefor.

Signed and Sealed this
First Day of February, 2011

David J. Kappos
*Director of the United States Patent and Trademark Office*